United States Patent [19]
Yaniger

[11] Patent Number: 5,296,837
[45] Date of Patent: Mar. 22, 1994

[54] STANNOUS OXIDE FORCE TRANSDUCER AND COMPOSITION

[75] Inventor: Stuart I. Yaniger, Ventura, Calif.

[73] Assignee: Interlink Electronics, Inc., Camarillo, Calif.

[21] Appl. No.: 911,769

[22] Filed: Jul. 10, 1992

[51] Int. Cl.⁵ .......................................... H01C 10/10
[52] U.S. Cl. ........................................ 338/47; 338/99; 338/100; 338/111; 338/112; 252/502
[58] Field of Search ................. 338/99, 114, 47, 100, 338/111, 112, 115, 120, 122, 125; 252/502, 503, 506, 510, 511, 518

[56] References Cited

U.S. PATENT DOCUMENTS 4,489,302 12/1984 Eventoff ............................ 338/99
4,745,301 5/1988 Michalchik ...................... 338/99 X
4,794,366 12/1988 Sakamoto ......................... 338/114

*Primary Examiner*—Marvin M. Lateef
*Attorney, Agent, or Firm*—Merchant, Gould, Smith, Edell, Welter & Schmidt

[57] ABSTRACT

A pressure transducer includes a base ply, a resistance ply disposed on the base ply and at least two spaced apart conductors juxtaposed in relation to the resistance ply whereby at least one of the conductors may be pressed against the resistance ply. The resistance ply is made by spraying or silk screening a mixture of a continuous matrix conductive resin and a stannous oxide particulate and then curing the composition to form a solid resistance ply having a surface with a multiplicity of micro-protrusions formed by the stannous oxide particulate.

23 Claims, 3 Drawing Sheets

STANNOUS OXIDE FORCE TRANSDUCER AND COMPOSITION

BACKGROUND OF THE INVENTION

The present invention relates to pressure transducers and compositions for making pressure transducers and in particular to transducers having a variable resistance layer made from a composition of stannous oxide particulate intermixed with a continuous matrix conductive resin which is applied in a thin layer to a surface and thereafter cured to form the resistance layer.

Pressure responsive transducers are known. For example, U.S. Pat. No. 3,806,471 to Mitchell describes a typical pressure transducer wherein conduction paths through a volume of a thick compressible layer would be increased thereby decreasing the resistance through the layer in response to application of an external force. These volume type pressure transducers were subject to many disadvantages including the size of the transducer and the relative rapid degeneration in performance.

An improved pressure transducer relying on variable contact across the surface of a thin layer is disclosed in Eventoff U.S. Pat. Nos. 4,489,302 and 4,314,227. While the Eventoff transducer provided significant improvement in pressure transducers, problems still remained. For example, performance characteristics varied widely depending on the characteristics of the composition and the care with which the manufacturing process was carried out. Even under stringent process controls, performance varied widely requiring that each transducer be tested in advance of use to determine if the transducer would meet specifications in those applications for which predictable performance was required Although in many applications the need to maintain precise performance specifications was unnecessary and hence wide variations in performance were tolerable, many applications required precise, repeatable and predictable performance. Furthermore, certain applications required performance characteristics to remain the same regardless of environmental factors such as heat and humidity.

In order to solve the problems with prior resistance plies and compositions and achieve the above advantages, numerous attempts over a period of more than seven years were made using different particulate materials and particulate and resin compositions. However, the performance deficiencies set forth above were not solved. Accordingly, the need for a pressure transducer which not only would be largely immune to manufacturing variations so as to be able to manufacture transducers with repeatable and predictable performance characteristics remained. Further, it was desired to have a transducer which would continue to perform according to a predefined specification despite variations in temperature and humidity. Finally, it was desired to have a composition for making the resistance layer forming the essential component of the pressure transducer which would have an extended shelf life.

Each of these advantages and objectives is met by the pressure transducer made with a composition comprising a mixture of a conductive resin and stannous oxide particulate. The conductive resin is optionally made of a carbon filled resin mixed with stannous oxide particulate preferably in a ratio of 1 part conductive resin to 4 parts stannous oxide. The resultant composition has a shelf life which is virtually unlimited. Furthermore, the conductive resin and stannous oxide particulate composition has been determined to be largely immune from manufacturing conditions which substantially affected the performance of prior transducers having resistance layers made with other particulate such as molybdenum disulfide or silica/alumina.

The present invention results in a pressure transducer which has stable, predictable performance characteristics largely independent of manufacturing conditions and subsequent environmental changes permitting a significant reduction in the cost of manufacture and an increased cost effective means of meeting customer tolerances and specifications. Further, the composition used to make the resistance layer has a long shelf life which enabled greater flexibility in the manufacture of force transducers.

SUMMARY OF THE INVENTION

A pressure transducer includes a base ply, a resistance ply disposed on the base ply and at least two spaced apart conductors juxtaposed in relation to the resistance ply whereby at least one of the conductors may be pressed against the resistance ply. The resistance ply is made by spraying or silk screening a mixture of a continuous matrix conductive resin and a stannous oxide particulate. The conductive resin and stannous oxide particulate mixture is applied in its liquid form over the surface of the resistance ply and is thereafter cured to form a solid resistance ply having a surface with a multiplicity of micro-protrusions formed by the stannous oxide particulate.

In the preferred embodiment, the composition of the conductive resin includes a non-conductive resin mixed with molecular size carbon particulate. The carbon particulate is substantially smaller in size than the stannous oxide particulate so that the conductive resin included a substantially continuous matrix of conductive particles. The stannous oxide particulate has a size in the range of about 0.5 to 10 microns with a ratio of stannous oxide particulate to conductive resin being in the range of 4 parts stannous oxide to 1 part conductive resin to about 1 part stannous oxide to 5 parts conductive resin. After being applied to a support surface, the composition is cured to form the resistance layer

BRIEF DESCRIPTIONS OF THE DRAWINGS

A complete understanding of the present invention and of the above and other objects and advantages thereof may be gained from a consideration of the following description of the preferred embodiments taken into conjunction with the accompanied drawings in which.

Figure 4:
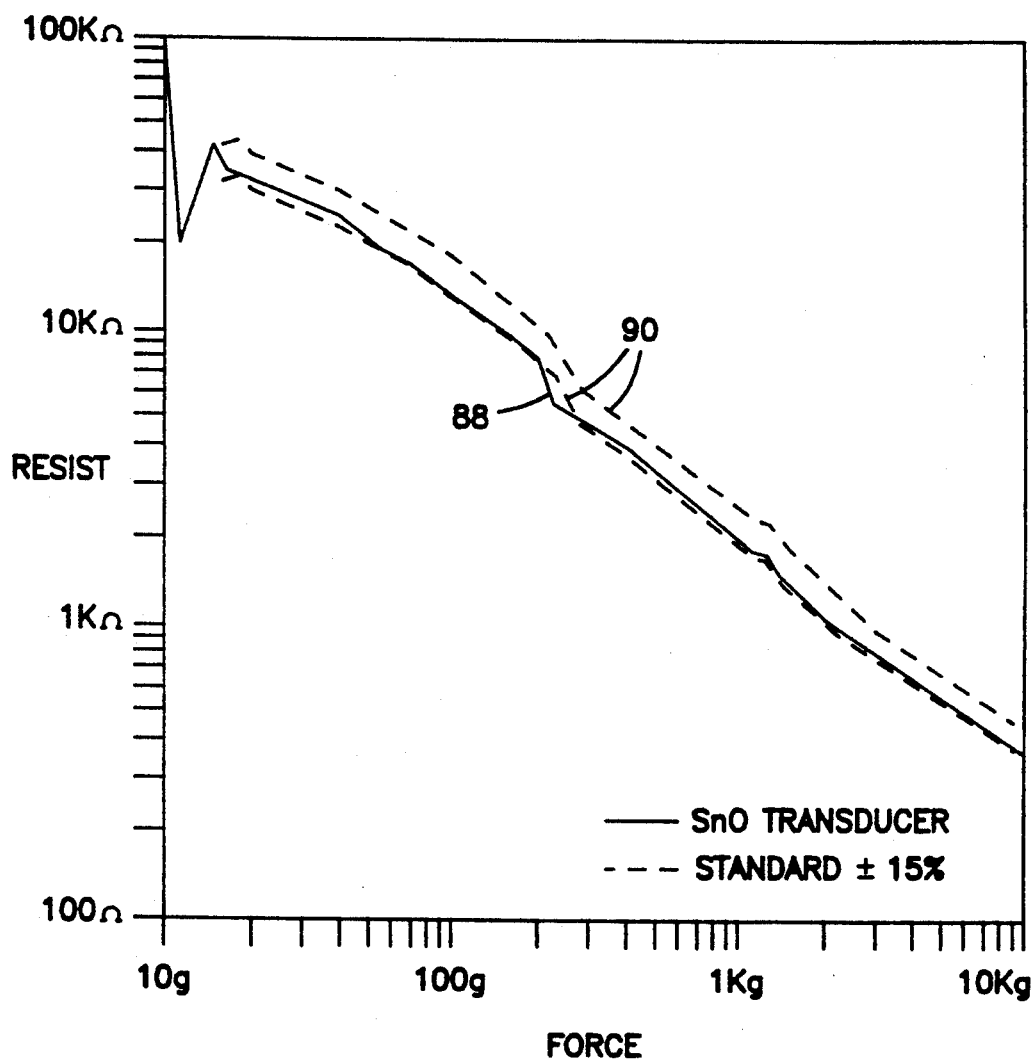
Figure 5:
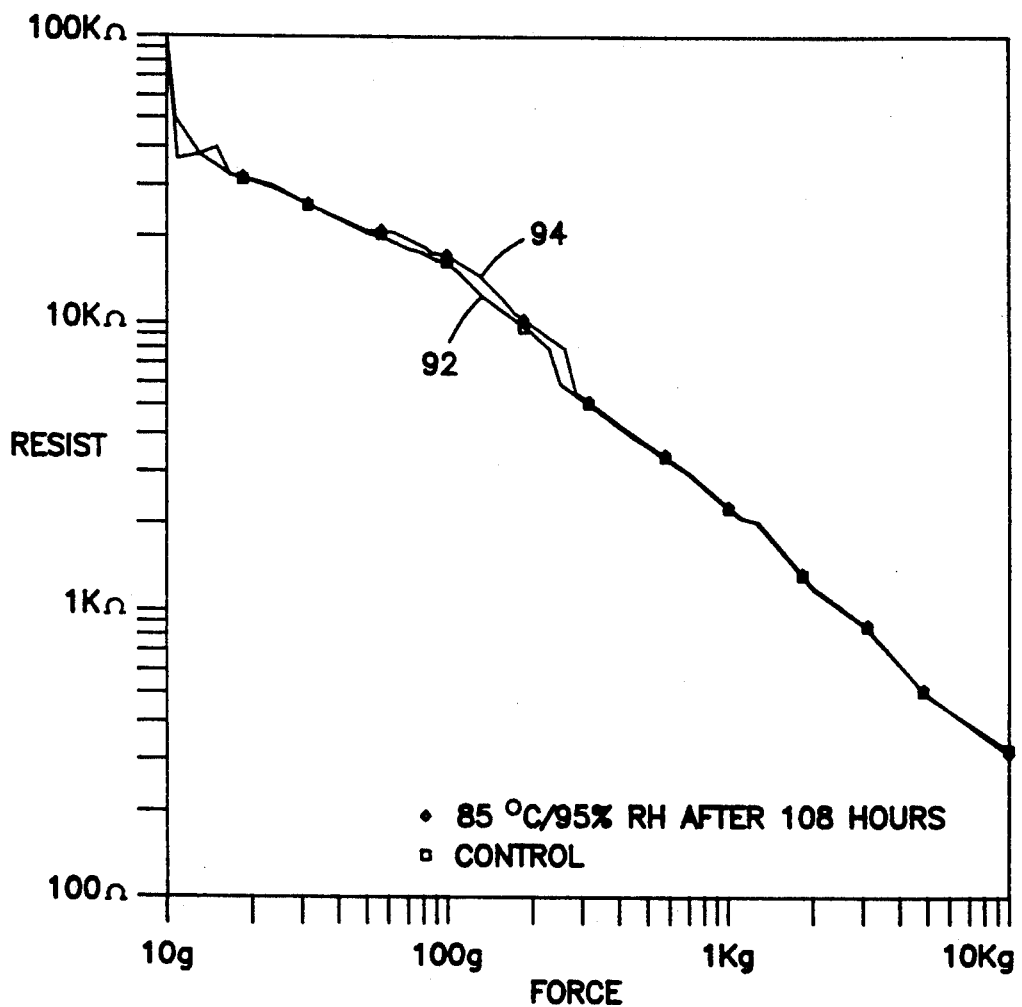

FIG. 4 is a graph illustrating the performance of the stannous oxide transducer in accordance with the present invention over a range of pressure forces; and FIG. 5 is an illustration of the performance of a transducer made in accordance with the invention before being subjected to environmental conditions in comparison with the performance of the force transducer after being subjected to 85#C at 95% relative humidity for 108 continuous hours.

DETAILED DESCRIPTION

Figure 1:
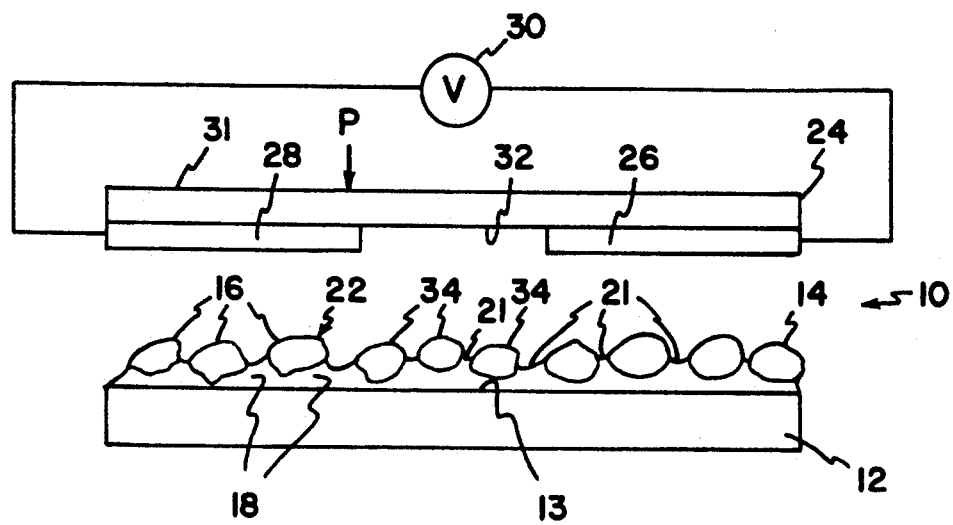
FIG. 1 is a side view of a pressure transducer having a resistance ply shown in exaggerated form to illustrate the present invention.

Referring to FIG. 1, a transducer 10 characterized by a resistance which varies in response to the amount of pressure applied to the transducer includes a base ply 12 which may be any support material such as plastic, Mylar or any other suitable nonconductive material which may be either a rigid, semi-rigid, or flexible. A resistance ply 14 is disposed on one surface 13 of the base ply 12 to provide the functional element of the transducer 10. The resistance ply 14, illustrated in exaggerated form in FIG. 1, includes a stannous oxide (SnO) particulate 16 intermixed in a conductive resin 18. The resistance ply 14 is applied in adhering relationship to one surface 13 of the base ply 12. The conductive resin 18 may be any suitable type of conductive resin readily available on the market such as Acheson 423 resin or Olin Hunt 205A resin. Each of these resins comprises a mixture of non-conductive resin base and a carbon particulate preferably in the molecular size but in any event substantially smaller than the particulate size of the stannous oxide particulate 16 so as to form a continuous matrix of the carbon in the resin when compare with the stannous oxide particulate 16.

In the preferred embodiment, the stannous oxide particulate has a size in the range of about 0.5 to 10 microns and is mixed with and held to the one surface 13 of the base ply 12 by the conductive resin 18. The stannous oxide particulate 16 provides a multiplicity of microprotrusions across the surface 22 of the resistance ply 14 to provide a surface against which electrical contact is variably made in response to variations in pressure to thereby provide a variable contact resistance.

Juxtaposed opposite the surface 22 of the resistance ply 14 is a conductor support ply 24 having a first surface 32 on which is disposed a first conductor 26 and a second conductor 28 which are electrically spaced from one another but positioned in facing relationship to the surface 22 of the resistance ply 14. A power source 30 may be interconnected across the first conductor 26 and the second conductor 28 to permit conduction between the first and second conductors through the resistance ply 14.

In operation, pressure P applied to the top surface 31 of the conductor support ply 24, causes the first conductor 26 and the second conductor 28 to press against the surface 22 of the resistance ply 14. The conductor support ply 24 and the first and second conductors 26 and 28 should be sufficiently bendable to cause the conductors to be pressed into the valleys 21 between the microprotrusions 34 formed by the stannous oxide particulate 16 and thereby increase the number of electrical contact points between the conductors and the surface 22 as the pressure is increased. Accordingly, the conductors 26 and 28 will come in contact with the continuous matrix conductive resin 18 forming contact points and hence conduction paths through the conductive resin 18 between the first conductor 26 and the second conductor 28. As the pressure P is increased, greater numbers and regions of contact between the first and second conductors 26 and 28 and the surface 22 of resistance ply 14 are created resulting in a greater number of conduction paths through the conductive resin 18 thereby causing the resistance across the resistance ply 14 to decrease. Thus, the resistance of the pressure transducer will vary inversely with the amount of pressure P applied to press the first and second conductors 26 and 28 into contact with the surface 22 and hence the conductive resin 18 of the resistance ply 14.

The particular embodiment illustrated in FIG. 1 is a shunt configuration including a resistance ply having a continuous matrix conductive resin in which a stannous oxide particulate 16 is intermixed as above described.

Figure 2:
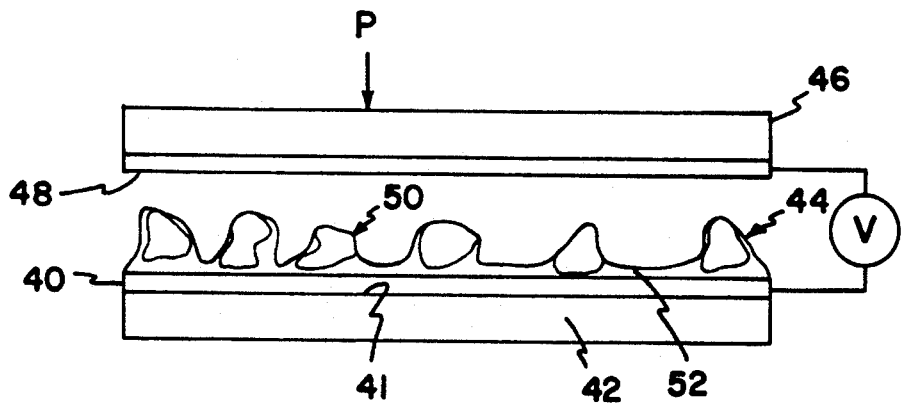
FIG. 2 is another embodiment of a pressure transducer wherein the conductors are positioned on opposite sides of the resistance ply.

Referring to FIG. 2, a "through" type pressure transducer device is illustrated wherein a first conductor 40 is disposed on the surface 41 of a base ply 42 with the resistance ply 44 of the type described in FIG. 1 applied across the surface 41 of the first conductor 40. A conductor support ply 46 supports a second conductor 48 in a position opposite the surface 50 of the resistance ply 44. Accordingly, when a pressure P is applied to the conductor support ply 46, the second conductor 48 is pressed into contact against the surface 50 of the resistance ply 44. Because of the bendable nature of the second conductor 48 and the conductor support ply 46 possibly in combination with the slight resilient deformability of the resistance ply 44, contact between the second conductor 48 and regions of the conductive resin 52 of the resistance ply 44 increases as the pressure increases. The increased surface contact causes increased conduction from the second conductor 48 through the resistance ply 44 to the first conductor 40 in proportion to the amount of pressure applied.

Figure 3:
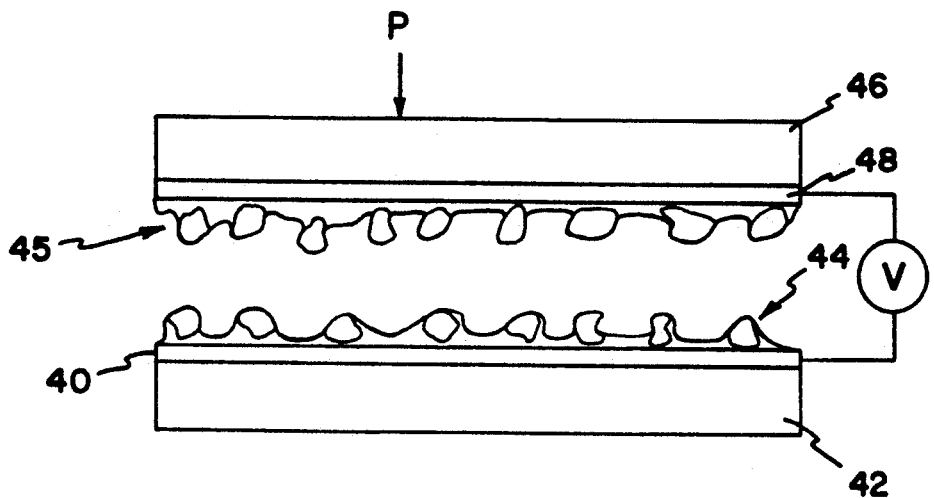
FIG. 3 is a third embodiment showing a through type transducer configuration with a resistance layer disposed over each of two facing conductors.

FIG. 3 illustrates a modification of the through type transducer in FIG. 2 where a second resistance ply 45 is disposed on the conductor 48. The juxtapositioning of the two resistance plies provide enhanced performances.

As will be recognized, the critical aspect of the present invention is the resistance ply. The resistance ply is formed of a composition of conductive resin blended with stannous oxide (SnO) particulate. As set forth in Eventoff, U.S. Pat. Nos. 4,314,227 and 4,489,302, a particulate mixed with a resin can be used to make pressure sensitive transducers. However, pressure transducers made according to the teaching of the Eventoff patent involved expensive quality control procedures during manufacture as well as the testing of each pressure transducer to achieve a product with consistent quality and performance characteristics. Furthermore, the resultant pressure transducer is very sensitive to temperature and humidity and other environmental conditions. Extensive experimentation over a number of years has failed to make material progress in addressing these problems.

However, it has now been discovered that a composition of stannous oxide particulate intermixed in a conductive resin provides a composition with a long shelf life enabling the composition to be manufactured well in advance of being applied to form the resistance ply of the pressure transducer. Further, the operation and performance characteristics of the resistance ply made from application of the stannous oxide composition is substantially immune to changes in environmental conditions such as temperature and humidity and remains the same over extended periods of continuous use. Consequently, the performance characteristics of pressure transducers made according to the invention remain the same even after the transducer has been subjected to temperature and humidity variations and extended use.

The composition from which the resistance ply 14 in FIG. 1 is made consists of a conductive resin in which is blended particulate stannous oxide. The particle size of the stannous oxide is preferably in the range of about 0.05 to 10 microns although the size may vary without departing from the invention in its broadest aspects. The conductive resin and stannous oxide are preferably blended in a ratio of 1 part by weight of resin and 4 parts by weight of stannous oxide particulate. However, the ratio of conductive resin to stannous oxide particulate can vary from about 4 parts resin to 1 part stannous oxide particulate by weight to 1 part resin to about 5 parts stannous oxide particulate by weight.

The conductive resin may be any suitable resin which conducts but is preferably a resin in which a carbon particulate is mixed. The size of the carbon particulate is substantially smaller than the stannous oxide particulate and is preferably in the molecular size but in any event at least several orders of magnitude in size less than the stannous oxide particulate so that the conductive resin appears and acts as a continuous matrix conductive resin. The ratio of molecular carbon particulate to non-conductive resin of the conductive resin may be 1 part carbon to 100 parts resin to about 25 parts carbon to 100 parts resin or any other suitable ratio which allows electricity to conduct through the resin in which the stannous oxide particulate is intermixed. Preferably the blend of conductive resin and stannous oxide is such as to form a liquid which can be sprayed or silk screened onto the surface of the base ply either in a continuous layer or any suitable desired pattern. The resin with the stannous oxide particulate blended therein is applied by spraying, silk screening, or any other suitable method to the base ply so as to form a thin layer which may, for example, be on the order of about 0.0002 to 0.001 inches thick. The layer of the composition is thereafter cured by any suitable means consistent with the type of resin used such as heat, ultraviolet light or the like to form the solidified resistance ply 14. The resistance ply 14 is thus permanently affixed and adhered to the one surface 13 of the base ply 12.

EXAMPLE 1

Acheson 423 conductive resin was blended in a ratio by weight of 1 part resin to 4 parts stannous oxide with particulate stannous oxide having a particle size in the range of about 0.5 to 10 microns. The resultant composition was silk screened in a thin layer on the order of about 0.0003 inch on a base ply of Mylar and was thereupon cured by heat to form a solid resistance ply which was in permanent adhering relationship to a base ply. The resistance ply was incorporated in a pressure transducer of the type illustrated in FIG. 1 and the resistance of the transducer measured in response to variations in pressure. Plot 88 in FIG. 4 sets forth the results of these tests. Similar tests were conducted on a number of force transducers made according to the above method using the same composition and each of the resultant transducers exhibited performance characteristics which were within the range 90 illustrated in FIG. 4. The force transducers made exhibited the consistent performance results despite variations in manufacturing conditions which have resulted in significant differences in performance for pressure transducers made using prior art compositions.

EXAMPLE 2

A fifty-fifty blend of Olin Hunt 205A carbon loaded resin was mixed with Olin Hunt 21DD102 non-conductive resin and the resultant fifty-fifty blend was then mixed with particulate stannous oxide in a weight ratio of 1 part blended resin to 4 parts stannous oxide particulate. The resultant composition was silk screened on a base ply after which it was heat cured to form the resistance ply. The resistance ply was incorporated in a pressure transducer as illustrated in FIG. 1 and was tested for response to pressure. The results are set forth in the plot 92 denominated as the control in FIG. 5. The force transducer demonstrated a variation in resistance in response to variation in force as indicated. The resultant transducer was then subjected to a continuous temperature of 85° C. at 95% relative humidity. The performance of the force transducer after 108 hours of being subjected to such environmental conditions was substantially unchanged as illustrated by the second plot 94 in FIG. 5 as compared with the control plot 92.

The composition of Example 2 was used to make a number of pressure transducers. All of the transducers exhibited substantially similar consistent performance characteristics which were repeatable despite variations in manufacturing processes and time when the composition was actually formulated. Likewise, the composition of example 2 was made 30 days before the composition was used to make pressure transducers. The results were substantially the same as illustrated in FIG. 4 indicating that the composition does not break down with time as with prior compositions. The test results in FIGS. 4 and 5 also demonstrated that transducers made using the composition according to the present invention experienced greater sensitivity at low force levels and that the resistance at low force levels was substantially more consistent and repeatable than prior pressure transducers which used particulates other than stannous oxide.

While the above described descriptions and examples have been given to illustrate the invention and its preferred embodiments, many variations in specific weight ratios and parameters are possible without departing from the spirit from the present invention in its broadest aspects. Accordingly, the following claims are intended to set forth the invention in its fullest and broadest aspects.

What is claimed is:

1. A transducer having a resistance which varies in response to the amount of applied force comprising:
   a base ply;
   a resistance ply disposed on the base ply, the resistance ply comprising:
      a continuous matrix conductive resin; and
      a stannous oxide particulate interspersed in the continuous matrix of conductive resin to form a surface with a plurality of microprotrusions formed by the stannous oxide particulate;
   at least two spaced apart conductors electrically interconnected across the resistance ply to enable electrical conduction through the resistance ply, at least one of the conductors juxtaposed opposite the surface of the resistance ply for being pressed thereagainst, the resistance to electrical current conducting through the resistance ply varying in response to the amount of force applied to press the at least one conductor against the surface of the resistance ply.

2. The transducer of claim 1 wherein there are two conductors, both conductors being juxtaposed opposite the surface of the resistance ply, the resistance ply being electrically interconnected in shunt orientation across the two conductors.

3. The transducer of claim 1 wherein there are two conductors, one positioned on each side of the resistance ply whereby electrical current is conducted through the resistance ply.

4. The transducer of claim 1 wherein the conductive resin further comprises a non-conductive resin base and molecular sized carbon particulate mixed therein.

5. The transducer of claim 1 wherein the stannous oxide particulate has a particle size in the range of about 0.5 to 10 microns.

6. The transducer of claim 1 wherein the weight ratio of stannous oxide in the conductive resin is in the range of 4 parts stannous oxide particulate to 1 part conductive resin to about 1 part stannous oxide to 5 parts conductive resin.

7. The transducer of claim 1 wherein the resistance ply has a thickness of about 0.0002 to 0.001 inches.

8. The transducer of claim 4 wherein weight ratio of carbon to non-conductive resin is in the range of one part carbon to one hundred parts non-conductive resin base to one part carbon to four parts non-conductive resin base.

9. A composition of matter for being disposed in a thin layer for forming a resistance ply juxtaposed between at least two conductors, the thin layer defining a surface against which at least one of the conductors may be pressed, the resistance ply having a resistance which varies in response to the amount of force with which the at least one conductor is pressed against the surface of the resistance ply, the composition of matter comprising:
   a conductive resin; and
   stannous oxide particulate interspersed through the conductive resin.

10. The composition of matter of claim 9 wherein the conductive resin further comprises a non-conductive resin base and molecular sized carbon particles interspersed therein.

11. The composition of matter of claim 9 wherein the stannous oxide particulate has a particulate size in the range of about 0.5 to 10 microns.

12. The composition of matter of claim 10 wherein the stannous oxide particulate has a particulate size in the range of about 0.5 to 10 microns.

13. The composition of matter of claim 9 wherein the weight ratio of stannous oxide in the conductive resin is in the range of 4 parts stannous oxide particulate to 1 part conductive resin to about 1 part stannous oxide to 5 parts conductive resin.

14. The composition of matter of claim 10 wherein the weight ratio of stannous oxide in the conductive resin is in the range of 4 parts stannous oxide particulate to 1 part conductive resin to about 1 part stannous oxide to 5 parts conductive resin.

15. The composition of matter of claim 11 wherein the weight ratio of stannous oxide in the conductive resin is in the range of 4 parts stannous oxide particulate to 1 part conductive resin to about 1 part stannous oxide to 5 parts conductive resin.

16. The composition of matter of claim 12 wherein the weight ratio of stannous oxide in the conductive resin is in the range of 4 parts stannous oxide particulate to 1 part conductive resin to about 1 part stannous oxide to 5 parts conductive resin.

17. The composition of matter of claim 10 wherein the weight ratio of carbon to non-conductive resin is in the range of one part carbon to one hundred parts non-conductive resin base to one part carbon to four parts non-conductive resin base.

18. The composition of matter of claim 10 wherein weight ratio of carbon to non-conductive resin is in the range of one part carbon to one hundred parts non-conductive resin base to one part carbon to four parts non-conductive resin base.

19. The composition of matter of claim 11 wherein the conductive resin further comprises a non-conductive resin base and carbon particles interspersed therein, the weight ratio of carbon to non-conductive resin is in the range of one part carbon to one hundred parts non-conductive resin base to one part carbon to four parts non-conductive resin base.

20. The composition of matter of claim 12 wherein weight ratio of carbon to non-conductive resin is in the range of one part carbon to one hundred parts non-conductive resin base to one part carbon to four parts non-conductive resin base.

21. The composition of matter of claim 13 wherein the conductive resin further comprises a non-conductive resin base and carbon particles interspersed therein, the weight ratio of carbon to non-conductive resin is in the range of one part carbon to one hundred parts non-conductive resin base to one part carbon to four parts non-conductive resin base.

22. The composition of matter of claim 16 wherein weight ratio of carbon to non-conductive resin is in the range of one part carbon to one hundred parts non-conductive resin base to one part carbon to four parts non-conductive resin base.

23. A transducer having a resistance which varies in response to the amount of applied force comprising:
   a first base ply;
   a first conductor disposed on the first base ply;
   a second base ply in facing relationship to the first base ply;
   a second conductor disposed on the second base ply;
   a first resistance ply disposed on the first conductor and a second resistance ply disposed on the second conductor and the first and second resistance plies comprising:
      a continuous matrix conductive resin; and
      a stannous oxide particulate interspersed in the continuous matrix of conductive resin to form a surface with a plurality of microprotrusions formed by the stannous oxide particulate;
   the two conductors to enable electrical conduction through the first and second resistance plies, the first and second resistance plies juxtaposed opposite each other for being pressed together, the resistance to electrical current conducting through the first and second plies varying in response to the amount of force applied to press the surfaces of the first and second resistance plies together.

* * * * *

UNITED STATES PATENT AND TRADEMARK OFFICE
CERTIFICATE OF CORRECTION

PATENT NO. : 5,296,837
DATED : March 22, 1994
INVENTOR(S) : Stuart I. Yaniger It is certified that error appears in the above-identified patent and that said Letters Patent is hereby corrected as shown below:

Column 2, line 44, after "layer" insert a period --.--.

Signed and Sealed this

Twenty-eight Day of February, 1995

Attest:

BRUCE LEHMAN

Attesting Officer    *Commissioner of Patents and Trademarks*